Feb. 23, 1954
W. Y. TURNER
2,669,782
GOLF PRACTICE SIGHTING DEVICE
Filed Oct. 9, 1951
5 Sheets-Sheet 2
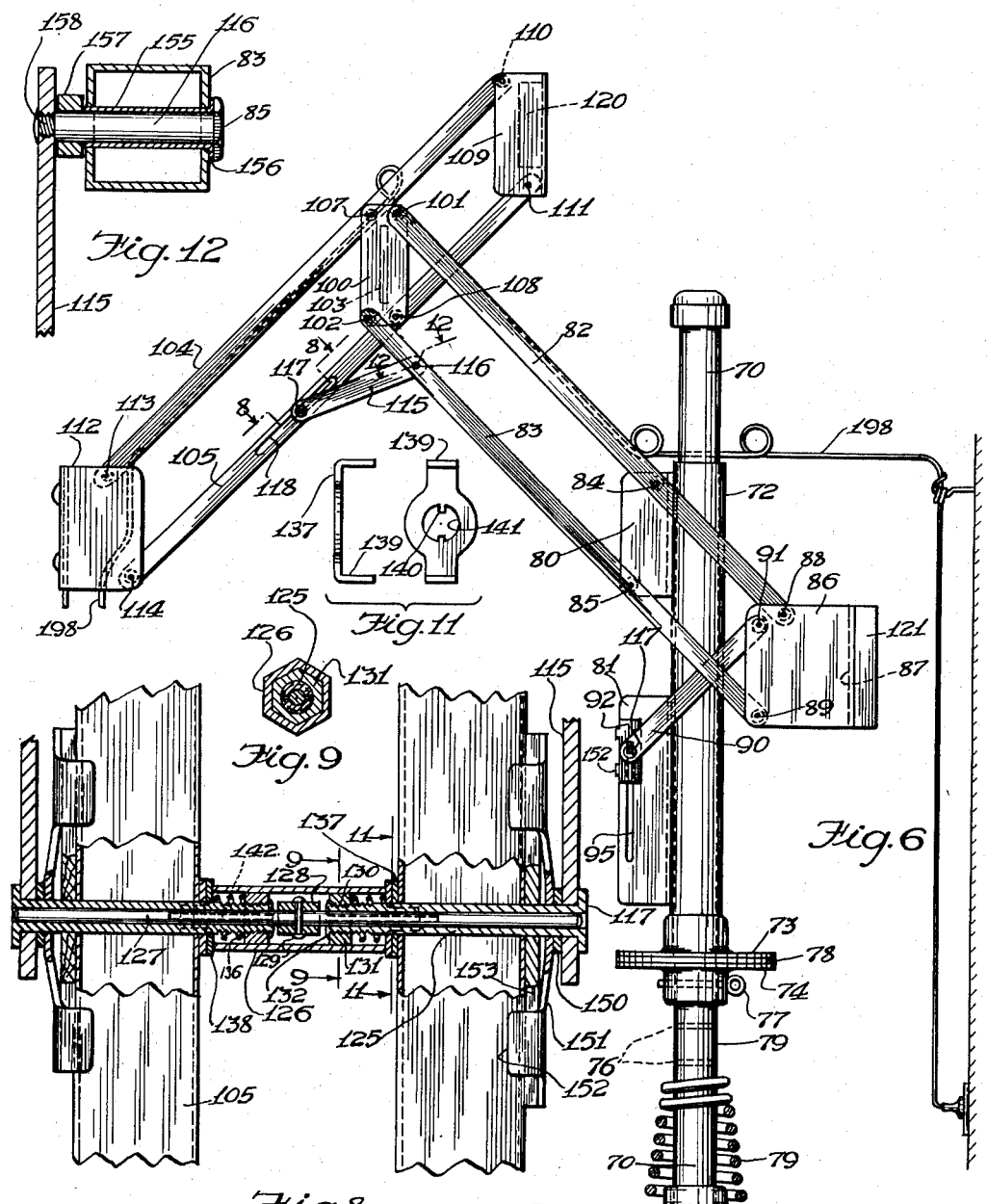
INVENTOR.
William Y. Turner
BY
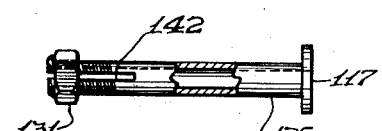
Attorneys.

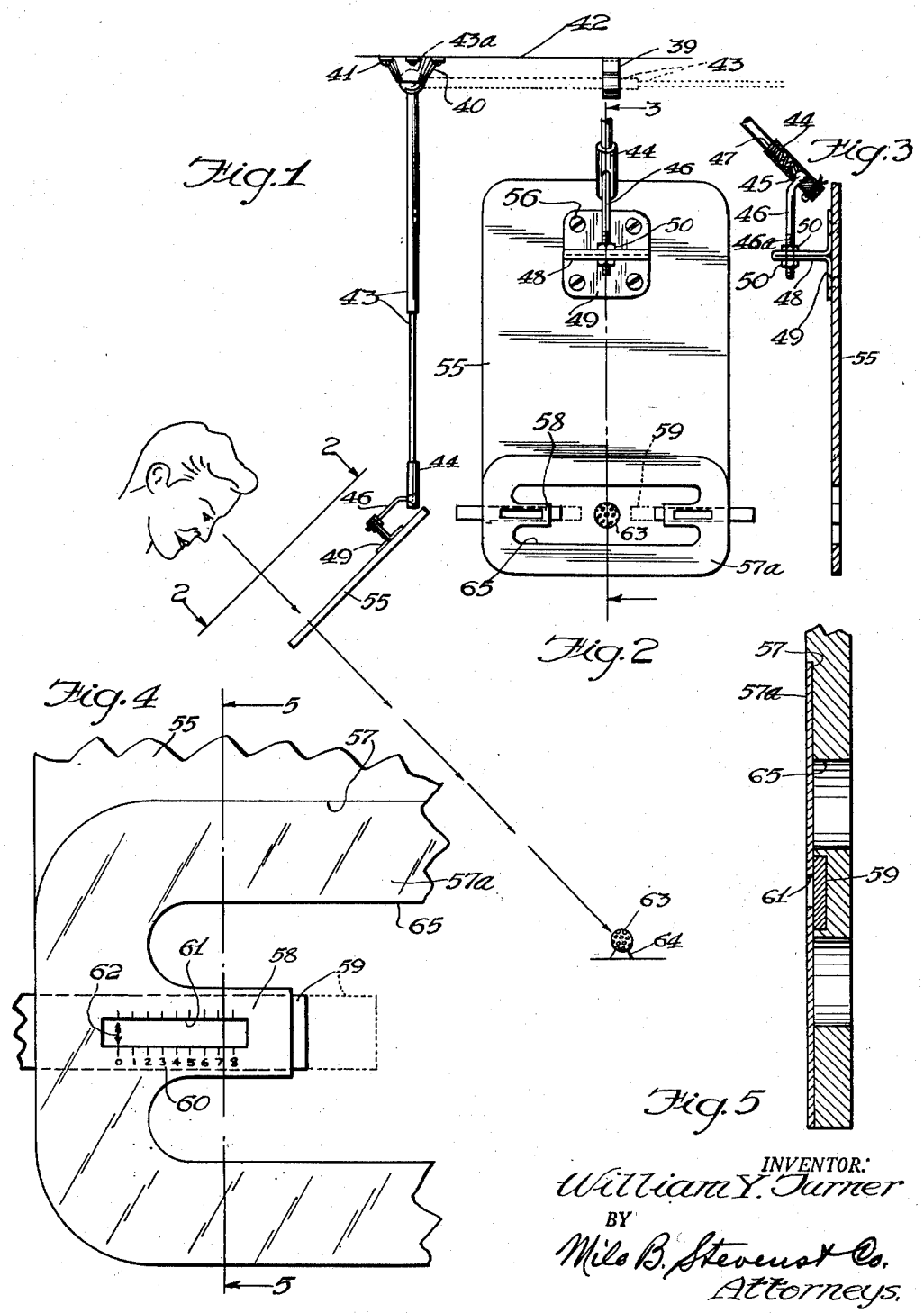

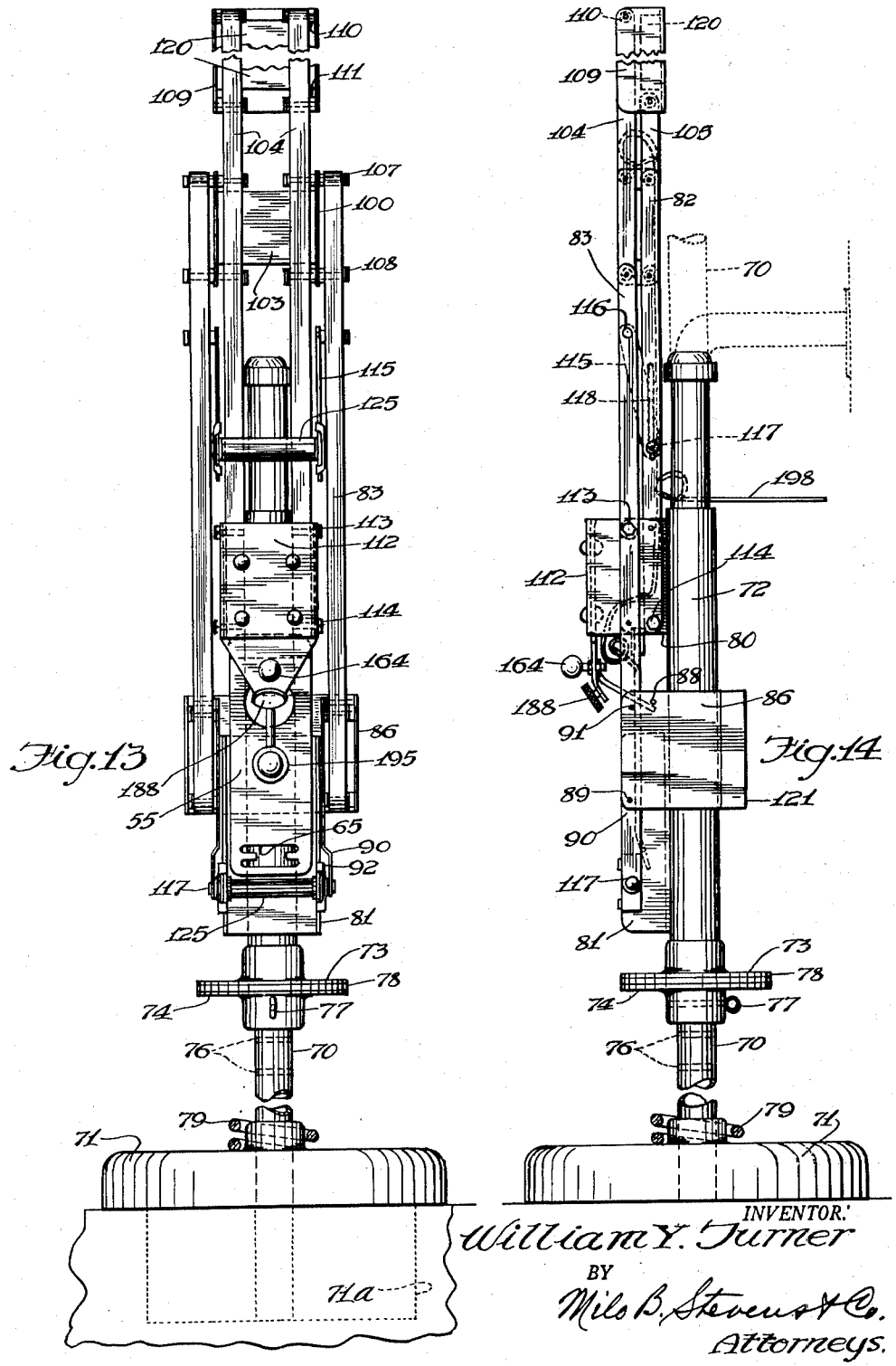

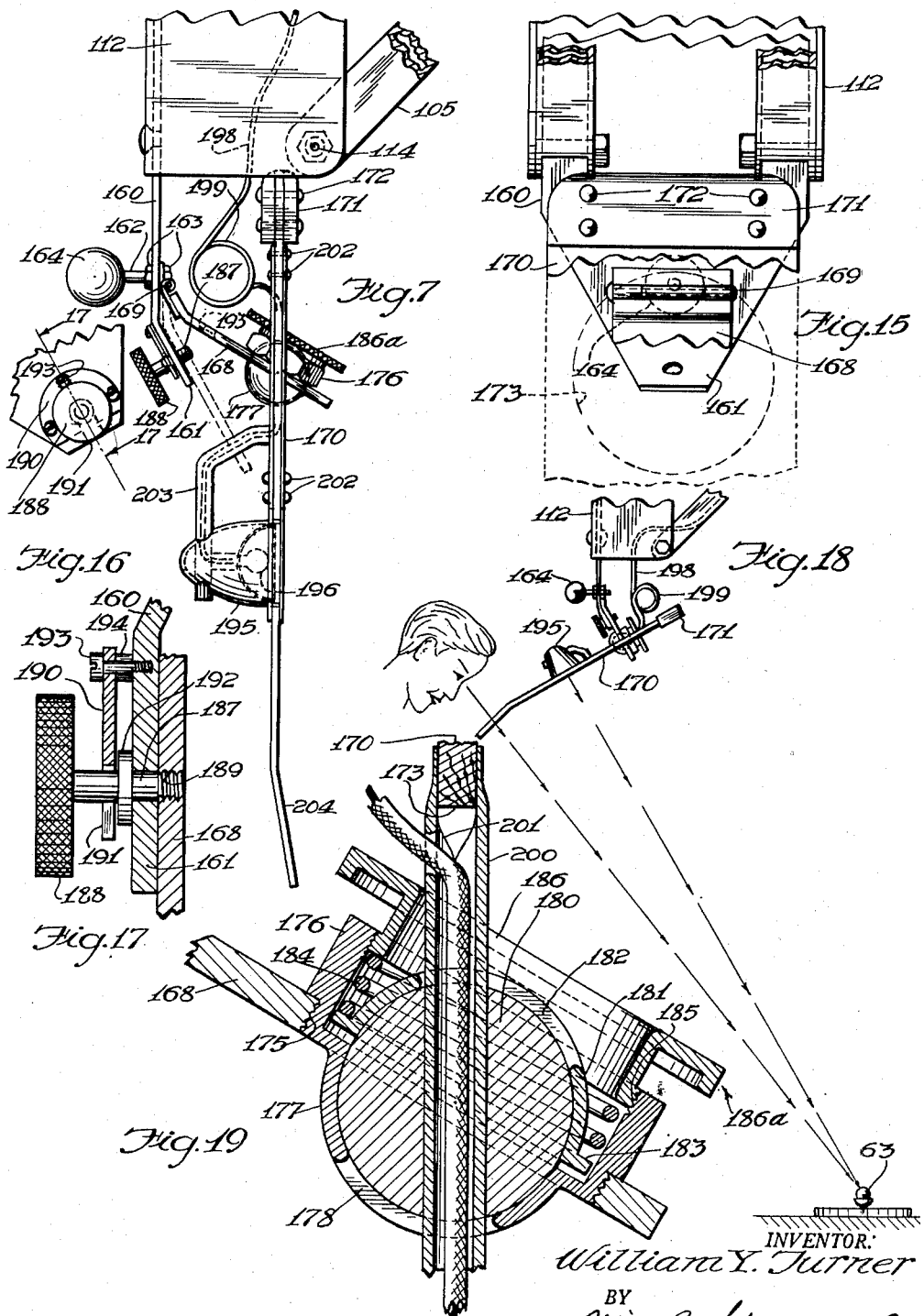

Feb. 23, 1954     W. Y. TURNER     2,669,782
GOLF PRACTICE SIGHTING DEVICE

Filed Oct. 9, 1951                                                5 Sheets-Sheet 5

INVENTOR.
William Y. Turner
BY
Milo B. Stevens & Co.
Attorneys.

Patented Feb. 23, 1954

2,669,782

UNITED STATES PATENT OFFICE 2,669,782

GOLF PRACTICE SIGHTING DEVICE

William Y. Turner, Chicago, Ill.

Application October 9, 1951, Serial No. 250,712

8 Claims. (Cl. 33—63)

My invention relates to means designed for assisting or training the golf player to make a more perfect swing in order to project the golf ball on the desired line of flight.

The act of addressing a golf ball involves body movements designed to accomplish a posture or stance calculated to insure a satisfactory golf stroke both as to the direction and distance the ball is projected.

The address of the ball is ordinarily identified by the body posture and club position preparatory to executing the golf stroke. However, it has been found—after watching the technique of outstanding professional and amateur golfers over a period of years—that the position and angle of the player's head during the address and stroke have an important influence on the satisfactory dispatch of the golf ball for the purpose referred to. In fact, it has been found that, with the head properly positioned, the body will often naturally assume the necessary posture for accomplishing a good stroke.

While it may be assumed that the person being trained could follow instructions with a view to securing and maintaining the correct head position during the address and golf stroke, it is often difficult for one to remember to assume such head position every time he tries to practice or play golf. It is therefore the principal object of my invention to provide an adjustable apparatus which induces the proper head and consequent body posture through the medium of a ball sighting device.

Another object is to provide a device of the above character which employs an objective for sighting the golf ball with both eyes and indicates the head position or change therein to the player by a prescribed condition in the sighting zone, such device operating by means of an aperture having a prescribed outline rather than any legend or marking directly in the path of vision toward the ball and apt to interfere with such vision.

Another object is to provide an apparatus which is in a convenient position and can be adjusted to suit the height and position of any person in order to facilitate the sighting of the golf ball and the execution of the stroke to dispatch the ball on the desired line of flight.

A further object is to provide an apparatus of the above character which may be handled with convenience or folded to occupy a compact space when not in use.

A still further object is to construct the novel apparatus along lines of mechanical efficiency and for economy of manufacture.

With the above objects in view, and any others which may suggest themselves from the description to follow, a better understanding of the invention may be had by reference to the accompanying drawings, in which—

Fig. 1 is a side view showing one form of the apparatus;

Fig. 2 is an enlarged duplication of a sighting unit forming part of the apparatus in Fig. 1, taken on the line 2—2 of Fig. 1;

Fig. 3 is an elevation taken from the right-hand side of Fig. 2;

Fig. 4 is a magnified reproduction of the left-hand bottom portion of Fig. 2, showing an adjustable element;

Fig. 5 is a section on the line 5—5 of Fig. 4;

Fig. 6 is a side elevation of the larger portion of another form of the apparauts;

Fig. 7 is a similar view of the remaining portion of the apparatus in Fig. 6 on a magnified scale and folded;

Fig. 8 is a magnified section taken on the line 8—8 of Fig. 6;

Fig. 9 is a section on the line 9—9 of Fig. 8;

Fig. 10 is an elevation, partly in section, of an item seen in the right-hand and left-hand central portions of Fig. 8;

Fig. 11 is an edge view and face view of a guide plate occurring in duplicate in the central region of Fig. 8 and indicated by the line 11—11 therein;

Fig. 12 is an enlarged section taken on the line 12—12 of Fig. 6;

Fig. 13 is a front elevation of the apparatus in Figs. 6 and 7 in folded position;

Fig. 14 is a view of the showing in Fig. 13 from the right-hand side;

Fig. 15 is a rear elevation, partly broken away, of the showing in Fig. 7;

Fig. 16 is an elevation of a securing device taken from the arrow 16 in Fig. 7;

Fig. 17 is an enlarged section of the securing device, taken on the line 17—17 of Fig. 16;

Fig. 18 is a reduced duplication of Fig. 7 unfolded and adjusted for the sighting of a golf ball;

Fig. 19 is a magnified section of a ball joint occurring in the upper central portion of Fig. 7;

Figs. 20a to 26a are views corresponding to Figs. 20 to 26 and representing optical impressions when sighting through the unit.

Figure 20:
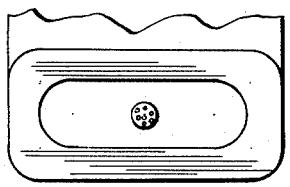
Figs. 20 to 26 are variations and modifications of the sighting unit seen in the bottom portion of Fig. 2.

Referring specifically to the drawings, one form of the apparatus is intended for suspension from a ceiling or other overhead support and involves basically a canopy 40 which is attachable by bolts or other suitable means 41 to the overhead support 42. A telescopically adjustable rod 43 depends from a conventional adjustable ball joint 43a made with the canopy 40, and receives a socket 44 at the bottom to form a ball joint 45 with a bracket 46, a spring 47 imparting pressure to the joint in order to keep it in snug engagement. The bracket 46 is threaded, as indicated at 46a, to receive a web 48 projecting from and forming part of an attaching plate 49, nuts 50 on both sides of the web being threaded on the bracket portion 46a to render the web adjustable along the bracket.

The attaching plate 49 is designed to support a light plate 55 of metal, wood or plastic material by means of screws 56, such plate being perforated to form a sighting unit. The plate is recessed from the front as indicated at 57 to seat a panel 57a perforated in registration with the sighting unit, the latter being of oblong form with the major dimension horizontal. The plate and panel are made with opposed projections 58 extended from the sides toward the middle; and these projections carry slides 59 which may be gathered or separated as indicated by dotted lines in Figs. 2 and 4. The extent of slide adjustment is calibrated by having a measuring scale 60 made on each projection 58 and a slot 61 made in one face thereof to expose the corresponding slide 59, the latter having an origin mark 62, as shown in Fig. 4.

Fig. 1 shows the plate 55 adjusted to an angle designed to facilitate the sighting of a golf ball 63 mounted on a tee 64. The ball is viewed through the opening 65 in the panel 57a and plate 55, as indicated in Fig. 2; and its position ordinarily appears visually midway between the slides 59, though not necessarily midway between the ends of the opening 65. However, in viewing the ball with both eyes as in Fig. 2, I have found that the optical effect is a gathering of the side elements in the opening 65, so that it is actually easier to fix the position of the ball as seen through the aperture of the sighting unit. It follows, where the panel is adjusted properly by the teacher with reference to the sighting of the ball, that the novice golfer will have to position his head accordingly in order to properly sight the ball for the course he intends it to take, so that the position of his head follows a prescribed arrangement and is the same every time he approaches the apparatus, assuming he places the ball in the same relative position. Obviously, practice with the apparatus will teach the golfer the prescribed head position, so that he may assume and maintain such position naturally during the stroke when he goes out on the golf course.

It will be apparent that the form of apparatus just described is limited to indoors or a practice court, and I have therefore devised the more elaborate second form which may also be used out in the open. Reference to Fig. 6 shows that such form of the apparatus is erected on a vertical standard 70 having a base 71. Fig. 14 shows the base portable for placement on a floor or other surface, while Fig. 13 shows how the base 71 may be eliminated and a concrete foundation 71a provided as a permanent base for the apparatus. Also, the standard 70 may be extended upwardly or rearwardly as indicated by dotted lines in the upper right-hand portion of Fig. 14 to secure the support of the apparatus from a ceiling or wall. A sleeve 72 is mounted and adjustable along the standard 70, the lower end of the sleeve carrying a transverse flanged plate 73. A companion plate 74 is carried slidably by the standard 70; and the level of the plate 73 is adjustable to several heights by making transverse bores 76 in the standard at desirable vertically spaced points and applying a key 77 through the plate 74 and the chosen bore. The sleeve 72 is also rotatable on the standard 70; and a lining 78 of brake material is interposed between the plates 73 and 74, in order that the sleeve 72 may remain stationary through friction at any point to which it may be turned. A spring 79 is coiled around the bottom portion of the standard 70 to rest on the base 71 and form a shock absorber in case support of the apparatus fails when the key 77 is removed.

It is intended that the standard 70 and its sleeve 72 form the basic support for a sighting unit similar to the plate 55 and panel 57a previously described, and means are extended from the sleeve 72 facilitating the positioning of the sighting unit at various heights and angles.

In carrying out the means just mentioned, the sleeve 72 is extended with upper and lower channel members 80 and 81, the backs of the channel members being welded to the sleeve. The sides of the channel member 80 are employed for pivoting upper and lower pairs of square parallel tubes 82 and 83 at 84 and 85, respectively. These tubes are inclined toward and beyond the rear of the sleeve 72 and terminate along the inner sides of a channel member 86 whose back 87 is in a rearmost position. The end portions of the tubes 82 and 83 applicable to the channel member 86 are pivotally secured thereto as indicated at 88 and 89. The channel member 86 also receives a pair of links 90, these being secured pivotally to the channel member 86 as indicated at 91 and inclined in forward direction, terminating alongside the upper portion of the channel member 81. Here the links 90 overlie a pair of bows 92 applied to the sides of the channel member 81; and special bolts 117 pass freely through the links 90, through the bow sides 92, through the brake linings 153 and into vertical slots 95 made in the channel member sides 81.

The forward end portions of the pairs of tubes 82 and 83 are applied externally to the diagonally opposite corners of a pair of vertical plates 100 as indicated at 101 and 102, such plates being rigidly joined by a cross-web 103. Two pairs of parallel tubes 104 and 105 extend in vertically spaced relation along the inner sides of the plates 100, being pivotally attached to the remaining corners thereof as indicated at 107 and 108.

The tubes 104 and 105 are inclined oppositely from the tubes 82 and 83; and the rear ends of the pairs of tubes 104 and 105 terminate along the inner sides of a channel member 109, being pivotally attached to such sides at 110 and 111, respectively. The forward ends of the pairs of tubes 104 and 105 terminate along the inner sides of a channel member 112, being pivotally attached thereto as indicated at 113 and 114, respectively. While the back of the channel member 109 is located at the rear, that of the channel member 112 is located in front. A pair of links 115 extend between the pairs of tubes 83 and 105, as seen in Fig. 6. Thus, the rear end portions of the links 115 are pivoted to the tubes 83 at 116, while pivot units 117 pass through longitudinal slots 118 made in the tubes 105.

The structure so far described in connection with the supporting sleeve 72 is designed not only for rotary horizontal and vertical adjustment, but also for folding into compact space. Thus, while Fig. 6 shows the structure in an extended position for use, Figs. 13 and 14 show it folded into compact vertical form. This is done by backing the series of tubes in a manner to swing on their pivots and gather toward each other. It is also intended that the structure remain in any position of extension by being self-balanced; and the balancing means are contained in the structure. Thus, to avoid the tendency of the structure to overbalance in forward direction, the channel member 86 receives a counterweight 121 externally in order to provide clearance within the member in respect to the standard sleeve 72, permitting the tubes 82 and 83 to fold parallel vertically with the tubes 104 and 105 when the apparatus is gathered as stated. The channel member 109 is equipped compactly with an internal weight 120. The condition applying to the present apparatus also applies to the standard 70 which depends from the ceiling as indicated by the dotted lines in Fig. 14.

It is essential that the adjustment of the links 115 relative to the pair of tubes 105 contain a sliding friction factor in order to maintain any desired setting between the links and tubes without fastening or adjusting expedients; and Figs. 8 to 11 show the friction means employed. Thus, the pivot 117 represents the end flanges or heads of a pair of alined tubular bolts 125 (see Fig. 10) previously indicated as special bolts, these passing through the links 115, washers 150, bows' sides 151, brake linings 153 and the sides of the tubes 105. The bolts 125 continue toward each other and terminate in opposed relation, such as indicated in Fig. 8. Between the tubes 105, the bolts 125 are contained in a hexagonal tubular casing 126.

A rod 127 is contained in the bolts 125 to maintain them in alinement; and a sleeve 128 is riveted on the rod as indicated at 129 and serves as an end stop for the rod in relation to the bolts 125. The latter are threaded externally in reverse directions on their innermost portions, as indicated at 130, into hexagon nuts 131 mounted in the casing 126 in a manner to slide but not turn in relation to the same, as clearly shown in Fig. 9; and the bolts are slightly flanged endwise as shown at 132 to primarily lock the nuts 131 from running off the bolts.

The bolts 125 carry freely plates 137 located endwise of the casing 126, such plates having end flanges 139 and being separated from the casing by washers 138 which overlap the tubes 105 and lock the plates from rotating relative to the tubes. One of the plates 137 is shown in Fig. 11, and it is seen that it has keys 140 entering its central opening 141. Fig. 10 shows that the inner portions of the tubular bolts 125 are formed with diametrically opposite slots 142. Thus, the keys 140 enter the slots 142 and prevent the bolts 125 from rotating. Compression springs 136 are mounted on the bolts 125 between the nuts 131 and the washers 138.

It is now apparent that the casing 126 may be employed as a manual control tending to gather the bolts 125 through turning the nuts 131 which compress springs 136. This action is intended to impart an adjustable pressure between the links 115 and the tubes 105. In this respect, it is noted from Fig. 8 that the spring compression acts on the heads 117 of the bolts 125 which bear on the links 115, and through the washers 150, bows 151 and brake lining 153 induces the pressure mentioned. It is now apparent that the inward pull on each bolt 125 will induce a frictional engagement between the bows 151 and tubes 105 by way of the brake elements 153, rendered yieldable to the compression springs 136 and controlling the freedom of movement between the links 115 and the tubes 105, whereby to maintain the setting of these parts until the user desires a change of position thereof.

The assembly of the tubular bolts 125 in relation to the channel member 86 and links 90 will be identical with that of the one shown in Fig. 8, except that the bows 92 will only engage the sides of the channel member 81 from the outer side.

The assemblies of the pivoting elements 84, 85, 88, 89, 91, 101, 102, 107, 108, 110, 111, 113 and 114 are generally identical and illustrated in Fig. 12. Thus, the tube 83 and link 115 may serve as an example wherein the tube is perforated to seat a bushing 155 having a flange 156 serving as a bearing for the bolt and its head 85. The bolt passes through a washer 157 on the opposite side and is finally reduced to form a screw 158 threaded into the link 115. The washer serves as a spacer to keep the parts in proper relation; and the assembly facilitates the free pivoting of the tube and link—or plate or flange, as the case may be—while keeping the same firmly secured against the shoulder of the bolt.

The channel member 112 forms an adjustable support for the sighting mechanism. Thus, Figs. 7 and 15 show that a plate 160 depends from the channel member 112 to terminate with a rearwardly deflected portion 161. The upright portion of the plate receives a bolt 162 secured by nuts 163 on both sides of the plate, the front end of the bolt having a knob 164 which is employed to move the channel member 112 in any desired direction when changes in the adjustment or folding of the sighting unit are desired.

The pendent plate 160 receives an inclined bracket 168 on the rear side, the bracket being hinged to the plate at 169. The bracket 168 is designed to support a plate 170 similar to the plate 55 for angular adjustment. Thus, Figs. 7 and 15 show that the upper portion of the plate 170 receives weights 171 on both sides, such weights being secured to the plates by rivets 172.

The plate 170 is formed with a large circular opening 173 in its upper portion which forms a clearance for a ball joint assembly carried by the bracket 168. Thus, Fig. 19 shows that the bracket is perforated and tapped at 175 to receive the one-piece receptacle 176 and socket 177 of the ball joint, the lower end of the socket having a circular opening 178. The ball is shown at 180, and a dome-shaped retainer 181 is mounted over the same, the upper portion of the retainer also having a circular opening 182. The retainer is marginally flanged at 183 to receive the pressure of a coil spring 184 located in the receptacle 176; and the latter is tapped as indicated at 185 for the application of a pressure ring 186 to control the flexibility of the ball joint. The pressure ring has an enlarged knurled knob 186a for manual control. The plate 170 is thus adjustable angularly by means of the ball joint to locate the sighting unit at the desired angle.

Figs. 7 and 17 show the plate 170 in the vertical position, which corresponds to the folded position of the apparatus. However, when the apparatus is to be used, the bracket 168 is swung in forward direction to the position indicated by dotted lines in Fig. 7. Here a screw 187 operated by a knob 188 passes through the portion 161 of the plate 160 to thread into a tapped aperture 189 made in the bracket 168, whereby to retain the bracket to the plate 160 and bring the plate 170 down to a position where it may be maneuvered for sighting accuracy. The screw 187 is retained to the plate portion 161 by a plate 190 which is bifurcated at 191 to straddle the shank of the screw and bear on a collar enlargement 192 of the screw. The plate 190 is held in spaced relation to the portion 161 by three screws 193 which receive spacing washers 194 between the plate 190 and the portion 161.

The plate 170 is equipped with a lamp housing 195 having a rearwardly facing spotlight 196. The current supply cord 198 for this bulb extends from the channel member 112 to loose form as indicated at 199 to enter a tube 200 in the center of the plate 170 and pass through the ball joint as indicated in Fig. 19. The tube is split near each end as indicated at 201 and the ends flattened and riveted to the plate 170 as shown at 202. The cord returns into forwardly directed position through a tubular bracket 203 connecting with the lamp housing 195. The spotlight is designed to emphasize the position of the ball 63; and the lower part of the plate 170 is deflected rearwardly as shown at 204 to facilitate the sighting on the illuminated area of the ball, as seen in Fig. 18. However, the part 204 may be separate and hinged or pivoted to the plate 170 in order to make the angle of the sighting aperture variable in relation to the plate 170.

Where the first form of the apparatus illustrated in Figs. 1 to 3 is employed, the following method of use is properly advisable: The player first grasps the telescopically adjustable rod, which is parallel to the ceiling as held by the clip 39 when not in use, and pulls it down to a more or less vertical position. He then adjusts the length and angle of rod 43 and the angle of plate 55 so that this plate is roughly at right angles to his sight on the golf ball 63, all as shown in Fig. 1. The ball will appear to the player through the opening 65 as shown in Fig. 2. The player will have an unobstructed vision of the ball with both eyes. It will be noted that the slides 59 will appear to the player's vision with both eyes as shown in the dotted lines. The effect of vision with both eyes is a considerably gathered position of both slides as shown by dotted lines in Figs. 2 and 4. The actual gathering of the slides can be adjusted and recorded by use of the calibrations on panel 57a. The width of the slides 59 could be the same as the apparent visual diameter of the ball as seen through the opening 65 in Fig. 2. This is intended as a considerable advantage in restricting the player's head movement because with the slightest raising or lowering of the head during a stroke, the ball appears decentered vertically between slides, and with any sidewise movement of the head the ball appears decentered laterally between the slide ends.

Though the actual gathering of the slides is adjustable as just mentioned, the most satisfactory setting of the slides will be when the optical effect of the slides for the player is about as shown in dotted lines in Fig. 2, that is, when the ball appears equidistant from the ends of the slides and the top and bottom of the opening. The object of such adjustment of the rod 43, panel 55 and slides 59 is to have the golf ball appear in the vision of both eyes of the player through the opening 65 in such a manner that when the player executes a golf stroke while keeping his eyes on the ball any movement of his head will give the optical effect of the ball itself moving out of the center of the aperture made by the ends of slides 59 and the top and bottom of opening 65. Thus, by practice, the player will endeavor to maintain his optical vision of the ball in the center of the aperture above described while executing his golfing stroke. Such practice would train the player's head to remain as stationary as possible, which habit would be beneficial when the player is out on the golf course in actual play and away from the apparatus. The use of this apparatus is particularly valuable when golf instructions are being given by a professional or teacher to a pupil. After the teacher places the golf ball 63 in a suitable position, he makes a preliminary adjustment of the position of the aperture in opening 65 of the plate 55 by adjustment of the length and angle of rod 43, adjustment of the angle of plate 55, and slides 59.

After making the above preliminary adjustment, the teacher has the player take his stance and endeavor to sight the ball through the aperture. The teacher will readily note what adjustments in the apparatus will need to be made in order that the pupil will stand at the correct distance from the ball and so that the pupil's legs, arms, body and head will assume the proper relationship for a correct address in relation to the position of the ball and the direction in which it is to be dispatched.

The pupil and teacher may note the position of the golf ball and adjustment of the apparatus so that the pupil may more easily assume the correct golfing pose or stance for future practice. The great benefit to pupil and teacher because of the apparatus is that the pupil, by observing the ball through the aperture, can himself work to keep his head still, leaving the instructor free to concentrate his efforts on the various movements connected with the proper execution of a golfing stroke.

Since many movements in golf, as well as balance, are apt to be upset when the player moves his head, the simple procedure of the player being able to have a mechanical guide to reduce the movement of his head as far as possible will in turn greatly facilitate the teacher's or professional's task in grooming the player's movements and balance in a correct swing, thus tending to rapid progress of the player in improving his golf game.

Even the most experienced player or champion, who knows just where his head should be positioned, will find the apparatus an effective help toward reducing his head movement and improving the quality and accuracy of his play.

Figs. 6 through 19 depict a second form of the apparatus with a more elaborate mounting and a slightly different form of panel and opening than above described in the first form of the apparatus. Before using the second form thereof, it should be noted that the standard 70 should be mounted vertically, whether depending from a ceiling or wall or set into a portable base, as shown in Fig. 14, or being embedded in concrete in the ground, as in Fig. 13. When the player is ready to use this second form of the apparatus, he would normally find it collapsed as in Figs. 13 and 14. The player would first grasp the knob 164 and, by pulling it toward him, would open and extend the apparatus as shown in Figs. 6 and 7. (The apparatus us usually rotated, extended, gathered, raised or lowered by the player grasping and exerting force on the knob 164.) He will then, while holding the knob in his left hand, pull the plate 170 toward him until he can engage the screw 187 into the inclined bracket 168 by turning the knob 188. The plate 170 is then adjusted to the desired angle by continuing to hold the knob 164 with the left hand and grasping and adjusting the plate 170 with the right. When a satisfactory adjustment of the plate 170 is reached, the knurled knob 186a on pressure ring 186 might be tightened, if necessary, to have the ball joint in Figs. 7 and 19 hold the plate 170 a little more firmly in the adjusted position.

The apparatus should remain in the selected position until moved again, since it is balanced by counter-weights 120 and 121, as shown in Fig. 6. The plate 170 also has a balancing counter-weight 171.

A further help to aid the plate 170 of the apparatus to maintain some preselected extended or folded position may be found in the adjustable sliding friction factors operating on the pair of tubes 105 at 117 and the channel member 81, also at 117, and the ball joint as shown in Fig. 19. The apparatus is also aided in maintaining a selected position—and prevented from rotating too freely—by the transverse flange plate 73 and companion plate 74 by means of the interposed brake lining 78. The flanged plate brake lining for friction at 73, 74 and 78 will be made of sufficient diameter to prevent the apparatus from rotating when not desired because of some slight force, such as the wind. All the aforementioned four sliding friction factors can have their tension so preadjusted that they will not need to be changed for considerable periods of ordinary use.

It will be noted that the plate 170 has a lamp housing 195 and spotlight 196, the beam of which the player can aim in the direction of the golf ball at night to make the ball stand out sharply in the player's vision. The lower end of the plate at 204 is bent slightly so that a right-angled light of the beam to the upper part of the plate 170 and the player's right-angle vision at 204 will more nearly converge on the ball (see Fig. 18).

Figure 20A:
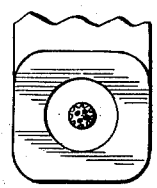
Figure 21:
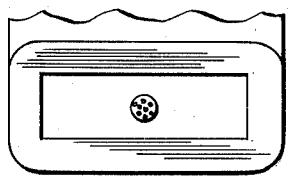
Figure 21A:
Figure 22:
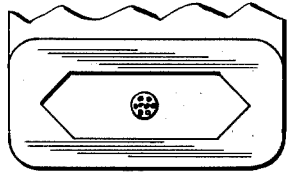
Figure 22A:
Figure 23:
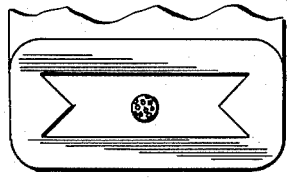
Figure 23A:
Figure 24:
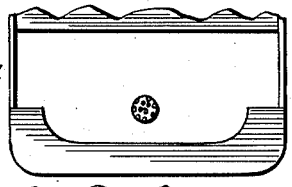
Figure 24A:
Figure 25:
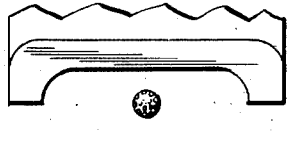
Figure 25A:
Figure 26:
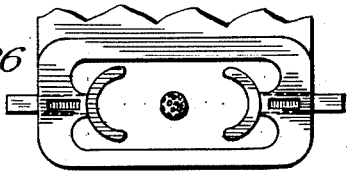
Figure 26A:
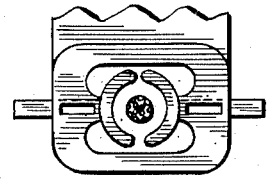

The advantages the player will enjoy in using the more elaborate second form of the apparatus —besides having a light directed on the ball for night practice—are that this form has many independent adjustments allowing a fine setting and a relatively greater stability in maintaining such finely set position. Also, for players of different heights the apparatus may be lowered or raised on its standard 70 by inserting the key 77 in various transverse bores 76 (see Fig. 6). At the end of a day's play the sleeve 72 bearing the collapsed apparatus may be raised off the standard 70 merely by unscrewing the top cap and removing the key 77. Various forms of the panel 57a and the opening 65 are shown in Figs. 20 through 26. The optical illusion or visual effect when the ball is viewed through the aperture with both eyes is shown in Figs. 20a through 26a. It is understood that other forms of apertures may be employed for viewing the golf ball, such as conical, circular, rectangular, etc.

While I have described the invention along specific lines, various minor changes or refinements may be made therein without departing from its principle, and I reserve the right to employ all such changes and refinements as may come within the scope and spirit of the appended claims.

I claim:

1. A device for sighting the position of a golf ball preparatory to executing a stroke to drive the ball, comprising a support, and a sighting unit adapted to be carried by the support in the path of the player's vision toward the ball, said unit comprising a frame having a horizontally-positioned and clear internal opening affording a view of the ball, and means extending into the opening from its sides to limit the width of said path in respect to the ball.

2. The structure of claim 1, the frame being rectangular and said means comprising projections of the side members of the frame at a height substantially midway between the upper and lower members thereof.

3. The structure of claim 1, the frame being rectangular and said means comprising projections of the side members of the frame at a height substantially midway between the upper and lower members thereof, and slides carried by said projections and operable toward each other to further reduce the width of said path.

4. The structure of claim 1, a hanger for suspending said support, and means between the hanger and the support to make the latter angularly adjustable in relation to the hanger.

5. The structure of claim 1, a hanger for suspending said support, and ball-joint means between the hanger and the support to make the latter angularly adjustable in relation to the hanger.

6. The structure of claim 1, the support having a second opening above the first-mentioned one, and a lamp mounted on the support to cast light through said second opening in the direction of the ball.

7. A device for sighting the position of a golf ball preparatory to executing a stroke to drive the ball, comprising a support, and a sighting unit adapted to be carried by the support in the path of the player's vision toward the ball, said unit comprising a frame having a horizontally-positioned and clear internal opening affording a view of the ball, means extending into the opening from its sides and to fixed limits to reduce the width of said path in respect to the ball, and second means movable relative to the first mentioned means to further reduce the width of said path.

8. A device for sighting the position of a golf ball preparatory to executing a stroke to drive the ball, comprising a support, and a sighting unit adapted to be carried by the support in the path of the player's vision toward the ball, said unit comprising a frame having a horizontally-positioned and clear internal opening affording a view of the ball, means extending into the opening from its sides and to fixed limits to reduce the width of said path in respect to the ball, and second means adjustable relative to the first means to reduce the width of said path to a portion and render the lateral position of such portion changeable.

WILLIAM Y. TURNER.

References Cited in the file of this patent

UNITED STATES PATENTS

| Number | Name | Date |
|---|---|---|
| 1,091,186 | Brown | Mar. 24, 1914 |
| 1,169,188 | Peck | Jan. 25, 1916 |
| 1,604,118 | Glancey | Oct. 26, 1926 |
| 1,677,261 | Williams | July 17, 1928 |
| 2,164,463 | Mather | July 4, 1939 |